3,215,706
SUBSTITUTED BENZYLOXYAMINES
Wilson B. Lutz, Florham Park, N.J., assignor to Warner-Lambert Pharmaceutical Company, Morris Plains, N.J., a corporation of Delaware
No Drawing. Filed May 31, 1962, Ser. No. 198,746
7 Claims. (Cl. 260—326)

This invention relates to substituted benzyloxyamines, such as p-hydroxy substituted benzyloxyamine, to their acid addition salts, and to a novel method for the production of said compounds.

The present invention also relates to certain novel intermediates useful in the synthesis of these substituted benzyloxyamines and to the preparation of these intermediates.

The benzyloxyamines prepared by the method of the present invention may be represented by the following structural formula

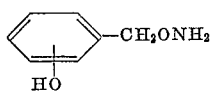

and, of these compounds, the para-hydroxy substituted benzyloxyamine is of particular interest. It has been found that p-hydroxy-benzyloxyamine is an active inhibitor in vivo of the enzyme β-hydroxylase. The enzyme β-hydroxylase is an important catalyst in the conversion of the amino acid tyrosine into nor-epinephrine. It is believed that a high blood level of nor-epinephrine is one of the primary causes of hypertension. When the nor-epinephrine blood level is lowered such as, for example, by interferring with or inhibiting its synthesis, a significant hypotensive effect is observed.

The free amine compounds described above are white crystalline solids. The acid addition salts of those amines are generally water soluble. For therapeutic use, the compounds can be utilized in the form of the aqueous solutions of their acid addition salts, or the salts or bases can be combined with various inert pharmaceutical diluents or carriers into dosage forms such as, for example, tablets, capsules, elixirs, suspensions and the like.

It has been found that for desirable biological activity, that is for inhibition of the action of the enzyme β-hydroxylase, the —OH and the —CH$_2$ONH$_2$ radicals are essential. Prior to the novel process of this invention, however, if an intermediate such as p-hydroxybenzaldehyde were to be employed in synthesizing compounds analogous to those of this invention by an attempted reaction to convert the aldehyde group to the —CH$_2$ONH$_2$ group the hydroxyl group had been found to be so unstable that even key intermediates such as p-hydroxybenzyl chloride were unstable.

By the novel process of this invention, the —OH function is first transformed into an ester group such as, for example, mesyloxy, tosyloxy, brosyloxy, that is p-bromobenzene sulfonyloxy, or pivaloyloxy, that is trimethylacetoxy, and, when the desired —CH$_2$ONB$_2$ group has been introduced by conversion of the —CHO group, alkaline hydrolysis in the presence of an antioxidant such as sodium borohydride will cleave the ester, restoring the —OH and thus affording the biologically active molecule. Thus, for example, p-mesyloxybenzyl aldehyde which is used as the starting material of this novel process, is prepared by reacting p-hydroxybenzaldehyde with mesyl chloride at a temperature of about —20° C. The newly introduced mesyl group confers adequate chemical stability and on hydrolysis reverts back to the hydroxy derivative.

The hydroxy substituted benzyloxyamines can be prepared by the following novel method which is exemplified by the following series of reactions:

Step I

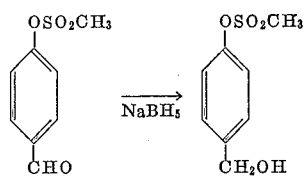

This reaction, involving the sodium borohydride reduction of p-mesyloxybenzaldehyde to p-mesyloxybenzyl alcohol is exothermic and preferably carried out in an alcoholic solution at a temperature of 15°–25° C.

In order to minimize alkaline cleavage of the mesyloxy or CH$_3$SO$_2$O— group when the above reaction has been completed an acid which is soluble in the solvent, for example, acetic acid is then added, the end of the reaction being easily recognized since the reaction is then no longer exothermic. Alkali metal fluoride such as sodium fluoride is also added to form a complex ion with borate ion which is liberated during hydrolysis of the intermediate borate ester. The formation of such a complex expedites the hydrolysis.

Step II

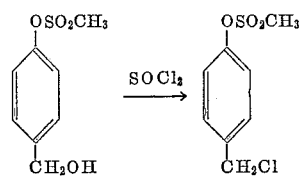

The conversion of p-mesyloxybenzyl alcohol to the corresponding p-mesyloxybenzyl chloride is effected by adding an excess of thionyl chloride to the p-mesyloxybenzyl alcohol in an inert organic solvent such as benzene at a temperature of from 0° to 4° C. and then heating the reaction mixture obtained to a temperature of 96° to 98° C. for from 5 to 15 minutes.

Step III

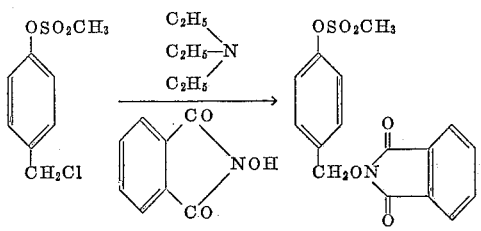

The foregoing reaction is preferably carried out employing a substantially anhydrous inert solvent reaction medium. Solvents such as, for example, dimethylformamide, acetonitrile, or pyridine are suitable. From 1 to 3 parts by weight of the solvent are employed for each part by weight of the p-mesyloxybenzyl chloride and then 1 to 2 parts by weight of triethylamine and 1 to 2 parts by weight of phthaloxime are added. The addition of a weak organic base such as triethylamine serves to take up hydrogen chloride which is formed during the reaction. The reaction is completed by heating at 96° to 98° C. for 1 to 2 hours.

Step IV

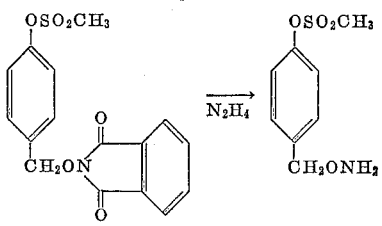

The N-(p-mesyloxybenzyloxy)phthalimide is dissolved in a solvent such as boiling acetonitrile and hydrazine hydrate is added after the solution has been cooled to the point where incipient crystallization commences. The reaction product p-mesyloxybenzyloxyamine is separated from the filtrate by evaporation of the solvent.

Step V

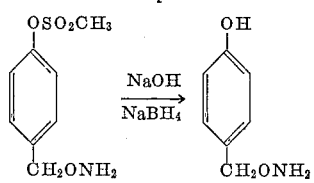

The hydrolysis of the p-mesyloxy group is carried out in aqueous sodium hydroxide solution containing sodium borohydride as an antioxidant.

The novel compound p-hydroxybenzyloxyamine contains a basic nitrogen atom which can react with acids to form acid addition salts. Such salts are readily prepared by the usual methods, such as, for example, the reaction of a stoichiometrically equivalent amount of the base and the desired acid in an inert common solvent. Examples of acids which are suitable for the preparation of acid addition salts of the amine base of this invention are inorganic acids, such as, for example, hydrochloric, nitric, sulfuric, phosphoric, and the like acids, and organic acids, such as, for example, benzoic, acetic, salicylic, maleic, tartaric, citric and the like acids. The preferred salts are those which are pharmaceutically acceptable, that is, they are acid addition salts which are no more toxic than the bases from which they are prepared and which possess the necessary physical properties that render them suitable for incorporation into dosage forms in combination with the desired pharmaceutical carriers.

In order further to illustrate this invention but without being limited thereto the following examples are given:

EXAMPLE I

Preparation of p-mesyloxybenzyl alcohol: 20 grams of p-mesyloxybenzaldehyde are dissolved in 20 ml. of methylene chloride and 0.95 grams of sodium borohydride are dissolved in about 60 ml. of 95% alcohol. The alcoholic solution is then added gradually over a period of 15 minutes to the p-mesyloxybenzaldehyde solution while at a temperature between 15°–25° C. After the reaction mixture has been stirred for 45 minutes, 6 ml. of acetic acid are added followed by a suspension of 5 grams of sodium fluoride in 60 ml. of water. The mixture is then stirred vigorously for one hour and filtered. The filter cake is washed with 80 ml. of methylene chloride and the organic and aqueous layers are separated. The aqueous layer is extracted with two portions of 40 ml. of methylene chloride. The methylene chloride extract is shaken with a saturated solution of sodium sulfate and then dried with anhydrous magnesium sulfate. After the solvent is removed by distillation, the p-mesyloxybenzyl alcohol formed is obtained as a pale yellow oil, which on standing at 25°–28° C. crystallizes into a solid melting at 37°–42° C. The product is purified by fractional distillation and the p-mesyloxybenzyl alcohol distillate crystallizes on cooling to a pure compound melting at 45°–48° C.

EXAMPLE 2

Preparation of p-mesyloxybenzyl chloride: To a solution of 18 grams of p-mesyloxybenzyl alcohol in about 40 to 80 ml. of benzene, is added 15 ml. of thionyl chloride, at 25° to 27° C. The resultant mixture is heated gently for 10 minutes at 96° to 98° C. The reaction mixture formed is then distilled at a temperature of 128° to 135° C. at 0.001 mm. of mercury pressure. The distillate, which contains the reaction product p-mesyloxybenzyl chloride, is obtained as a colorless oil which soon crystallizes into a waxy solid having a melting point of from 30° to 37.8° C. Further purification by recrystallization from ether and petroleum ether results in the separation of pure p-mesyloxybenzyl chloride which melts at 39.2° to 41.2° C.

EXAMPLE 3

Preparation of N-(p-mesyloxybenzyloxy)phthalimide: 13.8 grams of p-mesyloxybenzyl chloride are dissolved together with 10.5 grams of phthaloxime and 9 ml. of triethylamine in 25 ml. of dimethylformamide, and then heated at 96° to 98° C. for about 4½ to 5½ hours. After the reaction mixture has been cooled, it is poured into 200 ml. of water at a temperature of 0° to 4° C. to yield a precipitate containing the reaction product N-(p-mesyloxybenzyloxy)phthalimide. After filtration, the filter cake is air dried at 20° to 25° C. and then recrystallized from pyridine or acetic acid, the recrystallized N-(p-mesyloxybenzyloxy)phthalimide obtained melting at 164.2° to 165.8° C.

EXAMPLE 4

Preparation of p-mesyloxybenzyloxyamine: 2.4 ml. of hydrazine hydrate are added to 16.94 grams of N-(p-mesyloxybenzyloxy)phthalimide previously dissolved in 100–150 ml. of boiling acetonitrile and the mixture is allowed to stand for 20 minutes after which it is filtered. The filter cake is discarded while the filtrate is evaporated to give a semicrystalline mass which is the reaction product p-mesyloxybenzyloxyamine. The amine base is converted into its hydrochloride salt by dissolving it in acetonitrile and then adding 8.5 ml. of an ethereal solution of 3.3 N HCl. The acid addition salt readily crystallizes out of solution. After filtration, the crystals are washed with 95% ethyl alcohol and dried at 80° C. The dried p-mesyloxybenzyloxyamine hydrochloride melts at 211.2° to 214.6° C.

EXAMPLE 5

Preparation of p-hydroxybenzyloxyamine: 1 gram of p-mesyloxybenzyloxyamine hydrochloride is dissolved in 20 ml. aqueous solution of 1 N sodium hydroxide containing 0.15 gram of sodium borohydride at 40° C. and is allowed to stir for 16 to 20 hours. The mixture is cooled at 0° to 4° C. and 20 ml. of 1 N hydrochloric acid is added. The pH of the mixture is then adjusted to 8.9 by the addition of about 2 grams of potassium carbonate. The resultant mixture, containing the desired product, p-hydroxybenzyloxyamine, is evaporated to a dry paste at 90° C. and the paste is dried over phosphorus pentoxide. The crude compound is sublimed and the sublimate melts at 111° to 120° C. Further recrystallization from 2-propanol yields a purified compound melting at 124.2° to 127.2° C.

It is understood that the foregoing detailed description is given merely by way of illustration and that many variations may be made therein without departing from the spirit of my invention.

Having described my invention, what I desire to secure by Letters Patent is:

1. p-Methanesulfonyloxybenzyloxyamine.

2. A compound of the formula

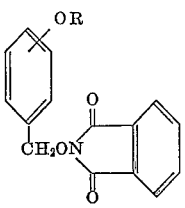

wherein R is a member of the group consisting of methanesulfonyl, toluenesulfonyl, p-bromobenzenesulfonyl and trimethylacetyl.

3. N-(p-methanesulfonyloxy)benzyloxy-phthalimide.
4. A compound of the formula

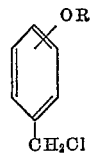

wherein R is a member of the group consisting of methanesulfonyl, toluenesulfonyl, p-bromobenzenesulfonyl and trimethylacetyl.

5. p-Methanesulfonyloxybenzylchloride.
6. A compound of the formula

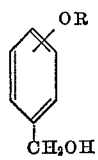

wherein R is a member of the group consisting of methanesulfonyl, toluenesulfonyl, p-bromobenzenesulfonyl and trimethylacetyl.

7. p-Methanesulfonyloxybenzyl alcohol.

References Cited by the Examiner

UNITED STATES PATENTS

| | | | |
|---|---|---|---|
| 2,995,567 | 8/61 | Sarrett et al. | 260—326 |
| 3,010,971 | 11/61 | Kaiser et al. | 266—319 |

FOREIGN PATENTS 609,907  5/62  Belgian.
(Abstracted in Chem. Abstracts, vol. 57, Nov. 1962, p. 13675b–e)

OTHER REFERENCES

Biel et al., Jour. Amer. Chem. Soc., 81, pages 2527–32 (1959).
Chemical Abstracts, vol. 54, p. 241 (1960).
Chemical Abstracts I, vol. 55, pp. 5519–5520 (1960).
Cram et al., Organic Chemistry, McGraw-Hill Book Co., Inc., New York, 1959, pages 219 and 446.
Drain et al., Life Sciences, No. 3, March 1962, pages 93–97. (Abstracted by Chem. Abstracts, vol. 57, 1962, p. 2799e.)
Mamalis et al., J. Chem. Soc., pp. 229–235 (1960).
Migrdichian, Org. Synthesis, vol. II, Reinhold Publishing Corp., New York, 1957, pages 336–337.
Roderick et al., J. American Chem. Soc., vol. 79, pp. 5196–5198 (1957).

NICHOLAS S. RIZZO, *Primary Examiner.*

IRVING MARCUS, *Examiner.*